United States Patent [19]

Little et al.

[11] Patent Number: 5,563,970
[45] Date of Patent: Oct. 8, 1996

[54] TAPER SHAPES FOR ULTRALOW SIDELOBE LEVELS IN DIRECTIONAL COUPLER FILTERS

[75] Inventors: Brent Little, Cambridge, Mass.; Chi Wu, Nepean; Wei-Ping Huang, Waterloo, both of Canada

[73] Assignee: Northern Telecom Limited, Montreal, Canada

[21] Appl. No.: 385,419

[22] Filed: Feb. 8, 1995

[51] Int. Cl.[6] .............................. G02B 6/00; G02B 6/36
[52] U.S. Cl. .............................................................. 385/42
[58] Field of Search ..................................... 385/9, 39–42

[56] References Cited

U.S. PATENT DOCUMENTS

| | | | |
|---|---|---|---|
| 4,243,295 | 1/1981 | Alferness | 385/9 |
| 5,309,534 | 5/1994 | Cohen et al. | 385/42 X |
| 5,428,701 | 6/1995 | St Ville et al. | 385/40 |

OTHER PUBLICATIONS

"Filter Characteristics of Codirectionally Coupled Waveguides with Weighted Coupling", Alferness, R. C., et al, IEEE Journal of Quantum Electronics, vol. QE–14, No. 11, Nov. 1978, pp. 843–847.

"Optical Directional Couplers with Weighted Coupling", Alferness, R. C., Appl. Phys. Lett. 35(3), 1 Aug. 1979, pp. 260–262.

"Sidelobe Suppression in Grating–Assisted Wavelength–Selective Couplers", Sakata, H., Optics Letters, vol. 17, No. 7, Apr. 1, 1992, pp. 463–465.

"Coupled-Mode Theory of Optical Waveguides", Haus, H. A., et al, Journal of Lightwave Technology, vol. LT–5, No. 1, Jan. 1987, pp. 16–23.

*Primary Examiner*—Akm E. Ullah
*Attorney, Agent, or Firm*—Foley & Lardner

[57] ABSTRACT

An optical directional coupler filter having at least two guides; an input guide and a coupled guide. The spacing between the guides and hence the interactive strength is tailored so as to provide ultralow sidelobe levels at a narrow spectral bandwidth. A formula has been derived with respect to the tapered shape function of the waveguides in order to arrive at the optimum results.

13 Claims, 7 Drawing Sheets

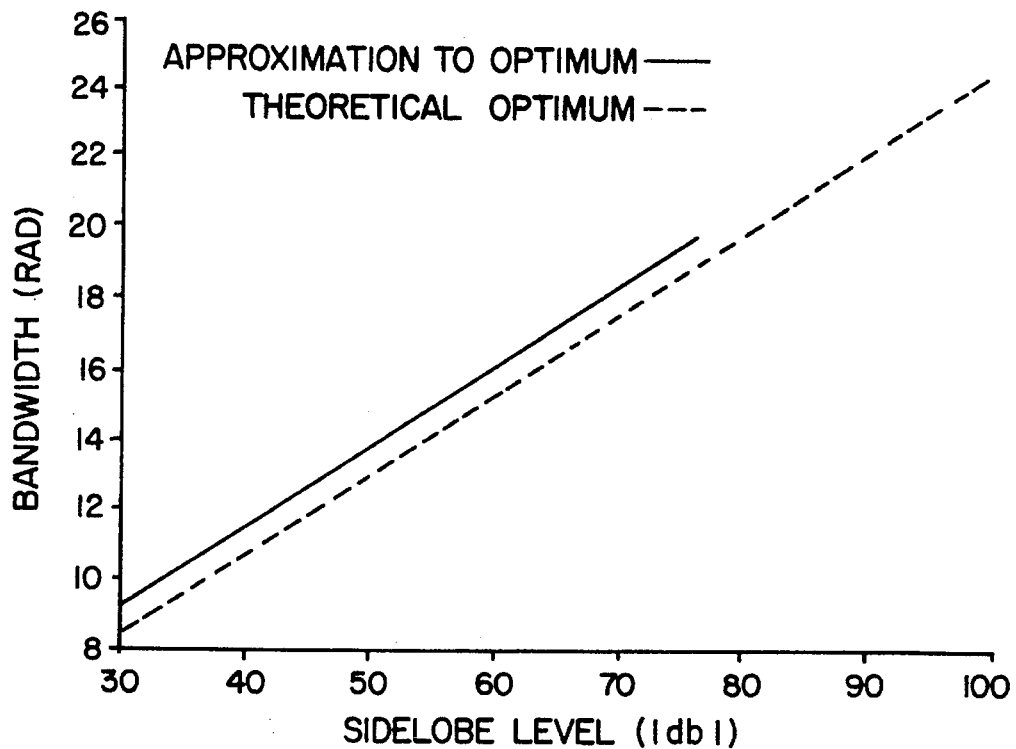
FIG. 7
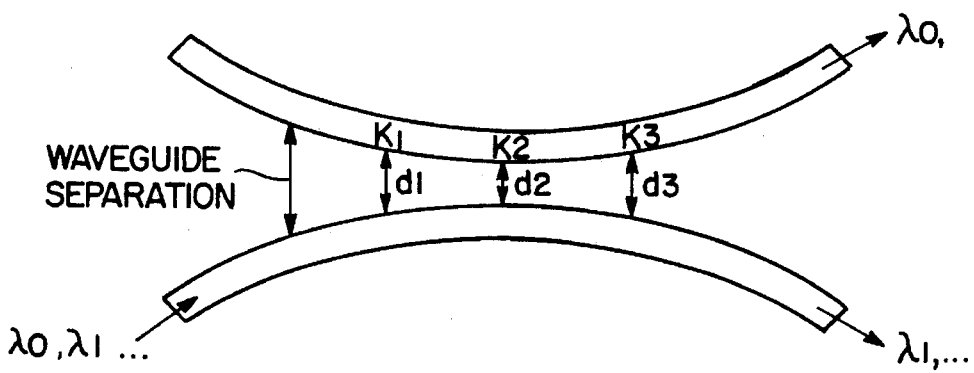
FIG. 8
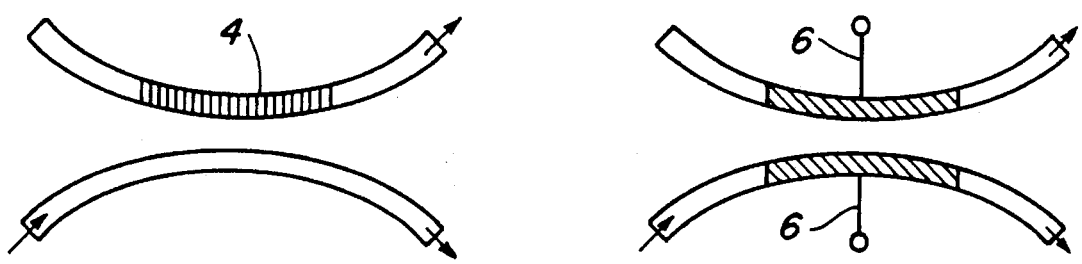
FIG. 9
FIG. 10

TAPER SHAPES FOR ULTRALOW SIDELOBE LEVELS IN DIRECTIONAL COUPLER FILTERS

FIELD OF INVENTION

This invention relates to directional coupler filters and more particularly to such filters wherein the spacing between the waveguides is tailored to maximize sidelobe suppression and to minimize bandwidth.

BACKGROUND OF INVENTION

The potential communication capacity of optical fibers operating in the low loss wavelength windows of 1.3 μm and 1.5 μm is in the order of tens of Terahertz. The practical utilization of this bandwidth may be realized through the use of wavelength division multiplexing (WDM). In this scheme the spectral range is subdivided and allocated to different carrier wavelengths (channels) which are multiplexed onto the same fiber. The frequency bandwidth that an individual channel occupies depends on a number of factors, including the impressed modulation bandwidth, margins to accommodate for carrier frequency drift and carrier frequency uncertainty, and also to reduce possible cross-talk between channels.

Although the isolated optical fiber may inherently have tremendous information carrying capacity, the overall optical communication link may be significantly restricted in bandwidth. These restrictions may result from the limited optical amplifier spectral windows, the availability of lasing sources and their tuning ranges, and also filter tuning ranges. Hence, to achieve efficient use of bandwidth requires that the available communications windows be densely filled with multiplexed channels. At the output of such a system, filters are needed to separate the wavelength channels. The performance of these wavelength filters in their ability to reject out of band signals, critically determines channel spacing and hence channel density.

The type of filters of interest here operate through a wavelength dependent exchange of power between two waveguide modes. It is well known that two waveguides placed in close proximity may exchange power through their evanescent fields, which penetrate the guiding layer of the other waveguide. This power exchange occurs continuously along the propagation direction, with a rate determined by the inter-waveguide spacing and the degree of velocity-matching of the two modes. If the velocities of the two waveguide modes are identical, the situation is termed 'synchronous' or 'phase matched', and the power coupled into one of the waveguides accumulates constructively. Complete power exchange is then possible and occurs at a characteristic coupling length $L_c$ which is determined by the structure of the device. If the modes propagate at different velocities, then this condition is termed 'non-phase matched' or 'asynchronous'. The power in the coupled waveguide accumulates with a phase error, leading to incomplete power transfer in this case. The larger the phase-mismatch, the faster the phase-error accumulates, which results in less power being transferred to the coupled waveguide.

FIG. 1a shows two typical waveguides placed in parallel, a configuration known as the directional coupler. The input power is initially launched into waveguide 1 (the 'input' guide), and the output is extracted from guide 2 (the 'coupled' guide). FIG. 1b shows the power in waveguide 2 (the 'coupled' guide) as a function of device length for two cases of phase-matching. The solid curve represents a synchronous case, with complete power exchange occurring at $L_c$ =5 mm. The dashed curve represents coupling between asynchronous modes.

Wavelength selectivity in the directional coupler occurs through differential velocity dispersion. At the design wavelength, the velocities of the two modes are equal. As the wavelength is changed or 'detuned', the mode velocities necessarily change. For filtering action however, it is critical that the difference between these mode velocities changes, i.e., a differential velocity dispersion is required. The rate of change of differential velocity with respect to wavelength is the primary factor in determining filter bandwidth. This rate is a function of material type and waveguide structure. FIG. 2 shows the filter response of a parallel directional coupler. The abscissa is in terms of a normalized detuning factor, $\Delta\beta$, which is a measure of the velocity difference between the coupled modes. This axis can be converted into an actual wavelength scale when the relationship between $\Delta\beta$ and wavelength $\lambda$, is established for a particular device. The ordinate is the power in the coupled waveguide, in logarithmic scale, for a device of fixed length. The normalized half-power bandwidth is 8.4 radians (rad), and the maximum sidelobe level is at −9.3 db.

For optical communications purposes, a sidelobe level of −9.3 db is too large, since it would represent a significant cross-talk to an adjacent wavelength channel, if these channels were spaced by the width of the passband. If it is required that the cross talk in an adjacent channel be less than −9.3 db, the spacing between adjacent channels in the wavelength domain must be made much larger than the main passband width. Since the sidelobe levels decrease at a slow rate with detuning (see FIG. 2), the channels must be widely separated. Hence, a severe penalty is paid in terms of channel density, and hence information carrying capacity, for the price of low cross-talk. It is very desirable then to identify some degree of freedom which may be used to improve filter response.

The degree of freedom most commonly used in directional couplers is a modulation of the interaction strength of the two coupled modes. This may be achieved for example, by modulating the inter-waveguide separation in the directional coupler. In many other branches of optics and physics this process is known as 'apodization'. In waveguide theory it is referred to as 'tapering'

Directional coupler devices are commonly modeled through a set of coupled differential equations such as:

$$\frac{dA_1}{dz} = -jke^{-j\Delta\beta z}A_2 \quad \text{Equation (1a)}$$

$$\frac{dA_2}{dz} = -jke^{j\Delta\beta z}A_1 \quad \text{Equation (1b)}$$

In (1a) and (1b) $A_1$ and $A_2$ represent the amplitudes in waveguides 1 and 2. $\Delta\beta$ is the detuning constant and k is the interaction strength. k depends on the waveguide structure and is strongly influenced by the separation between adjacent waveguides. The physical origin of this coupling may be due to the interaction of evanescent fields in a uniform coupler, (as in FIG. 1a), or coherent scattering in a grating-assisted coupler.

By varying the interaction strength k along the directional coupler, the spectral response of the device may be improved. The physical origin of this improvement is in the interferometric nature of the coupling process: at every position along the coupler, power is being transferred from the input waveguide to the coupled waveguide. The total power in the coupled waveguide at some point then, is an interferometric sum of all the power coupled into the waveguide prior to that point. That is, a sum including relative phase delays. By adjusting the interaction strength k along the waveguide, one dictates the rate of power transfer at each position, along with its phase relationship to the total coupled power. By judicious choice of the coupling taper shape k(z), it is theoretically possible to generate any (passive) response.

How to calculate the taper shape k(z) for a desired response has been a long standing unanswered design question. The original proposal, suggested in 1978 by Alferness et el, IEEE J. Quantum Physics, QE-14, No. 11, 1978, pp. 843–847, was based on an approximate Fourier transform relation which gave a few promising shapes. This proved to be a useful guideline in improving actual device response (Alferness, Applied Physics Letters, Vol. 35, No. 3, 1979, pp. 260–262), but thus far has been unsuccessful in yielding the sidelobe suppression required in communication systems. To date no improvements have been advanced, and the same shapes suggested in 1978 continue to be the only ones analyzed (see, for example, H. Sakata, Optical Letters, Vol. 17, No. 7, 1992, pp. 463–465).

The goal of filter design is to solve for the interaction function k(z) of (1), given some desired output response as a function of wavelength $A_2(\lambda)$. However, when k(z) is non-constant, the set of coupled equations in (1) has no analytic solution in general. Hence, filter design is currently guided by a set of approximate solutions. The most important of these approximate solutions is the Fourier transform relation, given by:

$$A_2(\Delta\beta) \approx \int k(z) e^{-j\Delta\beta \cdot z} dz \qquad \text{Equation (2)}$$

In Equation (2), $A_2(\Delta\beta)$ is the amplitude in the output or coupled waveguide as a function of detuning $\Delta\beta$, (which may be related to the actual wavelength $\lambda$). Because Equation (2) represents a Fourier transform relation between k(z) in the spatial domain and $A_2(\Delta\beta)$ in the wavelength domain, the principle of duality may be used. That is, given a desired $A_2(\Delta\beta)$, k(z) is found by the inverse Fourier transform. This approximation is valid for small coupling values, and does not extend to describe the critical region of the main passband and first few sidelobes. No analytic solution currently treats the important region around the central wavelength.

SUMMARY OF THE INVENTION

The present invention seeks to produce a directional coupler filter having a specific sidelobe level.

The present invention also seeks to produce a directional coupler filter having a specific sidelobe level and a minimum spectral bandwidth for the specific sidelobe level.

The present invention seeks to produce the aforementioned directional coupler filter by specifying an interaction strength function between waveguides.

The present invention seeks to produce the specified interaction strength by defining the shape function between the waveguides.

Therefore in accordance with a first aspect of the present invention there is provided a directional coupler filter comprising a first waveguide for receiving an optical signal having at least one wavelength; a second waveguide in a spaced relationship to the first waveguide so that the wavelength may be selectively coupled from the first waveguide to the second. The spaced relationships is tailored so as to suppress the spectral sidelobes of the coupled wavelength to a level down to −75 db.

In a preferred embodiment the spectral bandwidth is a minimum for the selected sidelobe.

In accordance with a second aspect of the present invention there is provided a method of suppressing sidelobe levels in an optical directional coupler filter, the filter having a first waveguide for receiving an optical signal with at least one wavelength and a second waveguide in spaced relationship to the first waveguide, the wavelength being selectively coupled to the second waveguide, the method comprising tailoring the interactive strength of the first and second waveguides according to formula:

$$k(z) = L_0(z) + SL_1(z) + S^2 L_2(z) + S^3 L_3(z)$$

wherein k(z)=interactive strength,

S=desired sidelobe level, in absolute dB, (|dB|), and $L_i = L_0, L_1, L_2, L_3, \ldots$ are functions of propagation distance (z).

BRIEF DESCRIPTION OF DRAWINGS

The invention will now be described in greater detail with reference to the appended drawings wherein:

FIG. 4b is the spectral response for the filter of FIG. 4a;

FIG. 4c is the spectral response of a physical device simulated with the beam propagation numerical method (BPM) and using the shape of FIG. 4a;

FIG. 7 illustrates the bandwidth/sidelobe level relationship for a coupler designed in accordance with the present invention and the theoretical optimum;

FIG. 8 is a plan view of a practical embodiment of the present invention;

FIG. 9 is a plan view of the coupler of FIG. 8 having gratings to assist the coupling; and FIG. 10 is a plan view of the device of FIG. 8 having electrodes for electro-optic tuning.

DETAILED DESCRIPTION OF THE INVENTION

As stated the objective herein is to produce filters with a specific sidelobe level. The response of the coupler in between sidelobes is unimportant, since by definition the sidelobes represent local extrema. If we have some coupler shape $k_0(z)$, then the following error vector is defined:

$$E(k_0)=[e_0(k_0),e_1(k_0),\ldots e_m(k_0)]. \quad \text{Equation (3)}$$

The components $e_i$, $\{i=1\ldots m\}$ describe the error between the desired sidelobe level and the current sidelobe level for shape $k_0$, for each of the m sidelobes considered:

$$e_i=(\sigma_i-\rho_i),$$

where $\sigma_i$ is the desired sidelobe level and $\rho_i$ is the current sidelobe level for sidelobe i.

We let the arbitrary coupling coefficient be represented as $k(z)=\Sigma^N \alpha_n f_n(z)$, where the $f_n$ is an arbitrary set of functions. The unknowns are the coefficients $a_n$ which are written in a vector, $\vec{k}=(a_1,a_2,\ldots a_N)$. Given an initial state $\vec{k}_0$, an improvement to $\vec{k}_0$ denoted by $\vec{k}^*=\vec{k}_0+\Delta\vec{k}$ is found by evaluating the incremental improvement vector $\Delta\vec{k}$, $$\Delta\vec{k}=\alpha J^T(JJ^T)^{-1}E(\vec{k}_0) \quad \text{Equation (4)}$$

where $$J_{ij}=\frac{\partial \epsilon_i}{\partial k_j}$$

is the Jacobian, and $\alpha$ is a scaling parameter used to decelerate the convergence. Equation (4) is repeatedly applied until a satisfactory optimization is achieved. Hence the optimum value is analytically given by the function $k(z)=\Sigma \alpha_n f_n(z)$.

Achieving the desired sidelobe level is the first criteria in filter synthesis. The second criteria is to obtain the narrowest bandwidth while still maintaining the maximum tolerable sidelobe level. This second criteria is met when all sidelobe levels are at the maximum tolerable level. This may be proved rigorously in the following way. Define the coupler bandwidth B, as a function of the levels of all the sidelobes: $B=B(s_1,s_2,s_3,\ldots)$ where $s_j$ is the absolute value of sidelobe j. Evaluate the gradient of B with respect to the vector $\vec{S}=(s_1,s_2,s_3,\ldots)$, $$\vec{W}(\vec{s})=\vec{\nabla}_s B=\left(\frac{\partial B}{\partial s_1},\frac{\partial B}{\partial s_2},\ldots\right). \quad \text{Equation (5)}$$

$\vec{W}(\vec{s})$ is numerically shown to be positive definite, indicating that decreasing any sidelobe has the effect of increasing the bandwidth B. Hence for a desired maximum sidelobe level x, all sidelobes must be below x by definition, but to achieve the minimum bandwidth, they should only be infinitesimally below x.

Figure 1A:
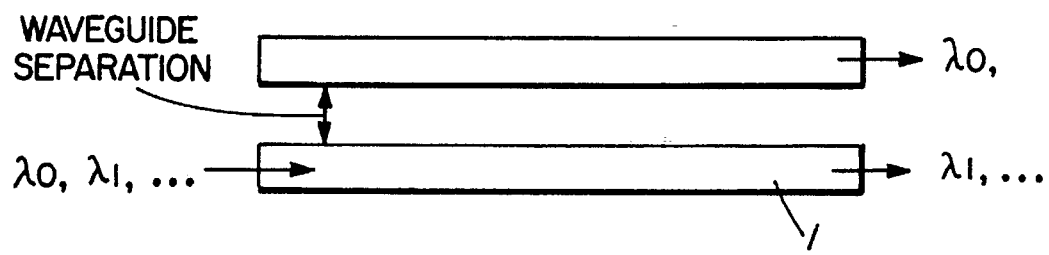
FIG. 1a is a plan view of a directional coupler having parallel (non-tapered) waveguides.
Figure 1B:
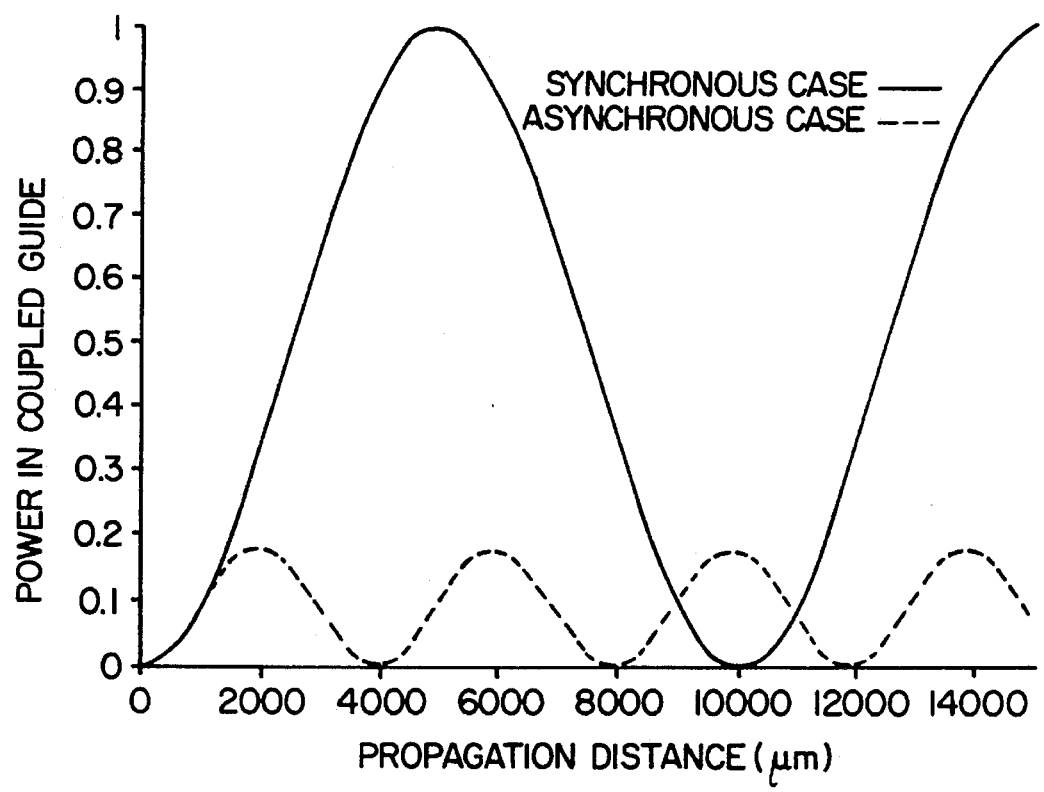
FIG. 1b shows the power in the coupled waveguide as a function of propagation distance for synchronous and asynchronous designs.
Figure 2:
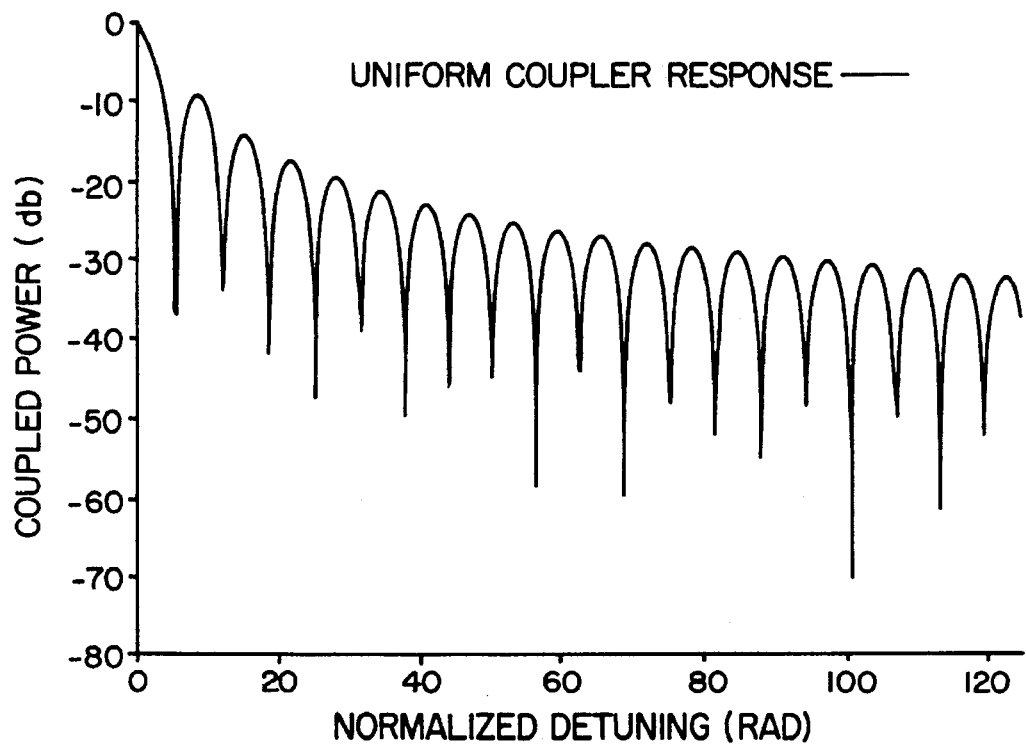
FIG. 2 illustrates graphically the spectral response of a parallel coupler.
Figure 3:
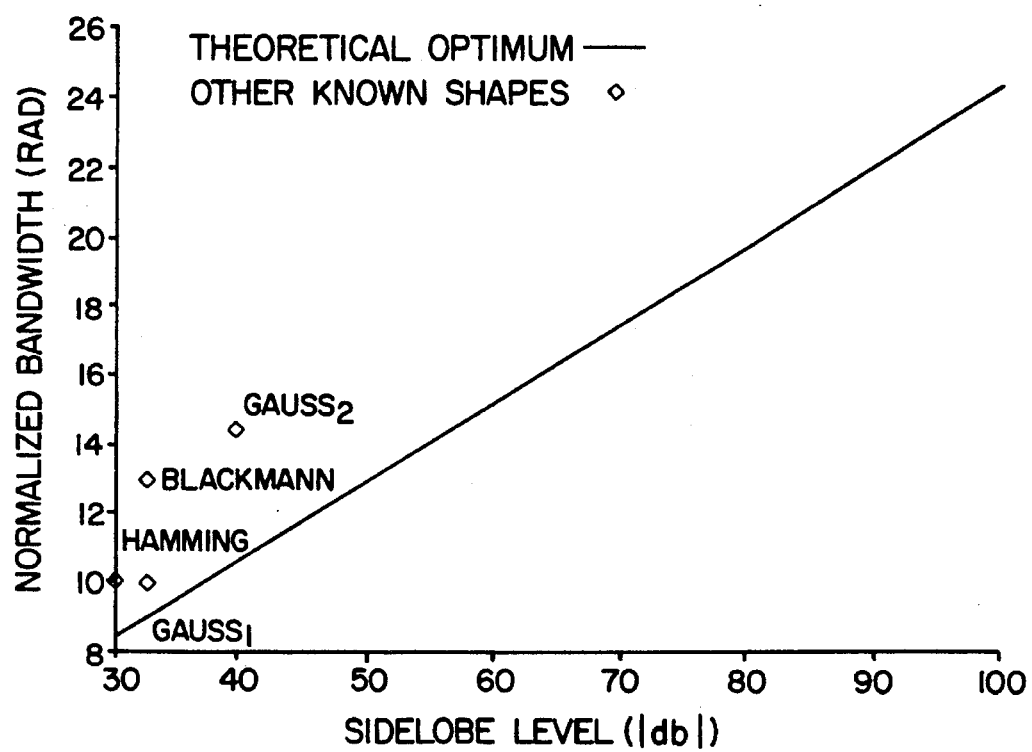
FIG. 3 shows the filter bandwidth as a function of the highest sidelobe level.

Using the above method, a coupler with arbitrarily low sidelobes may be theoretically generated. Before actual shapes are presented for various couplers, the overall achievements are compared to currently known taper functions. In FIG. 3, the trade off between the desired sidelobe level (abscissa) and the bandwidth at that level (ordinate) is shown. The solid curve represents the theoretical results derived here. This represents the narrowest possible bandwidth at a desired sidelobe level, a coupler cannot have a response that lies below this line. For comparison, the response of a few of the well known shapes are plotted as labeled points. The best known couplers have a maximum sidelobe level in the range of −40 db to −45 db. On the other hand, the method presented here may generate couplers with sidelobe levels several orders of magnitude lower.

Figure 4A:
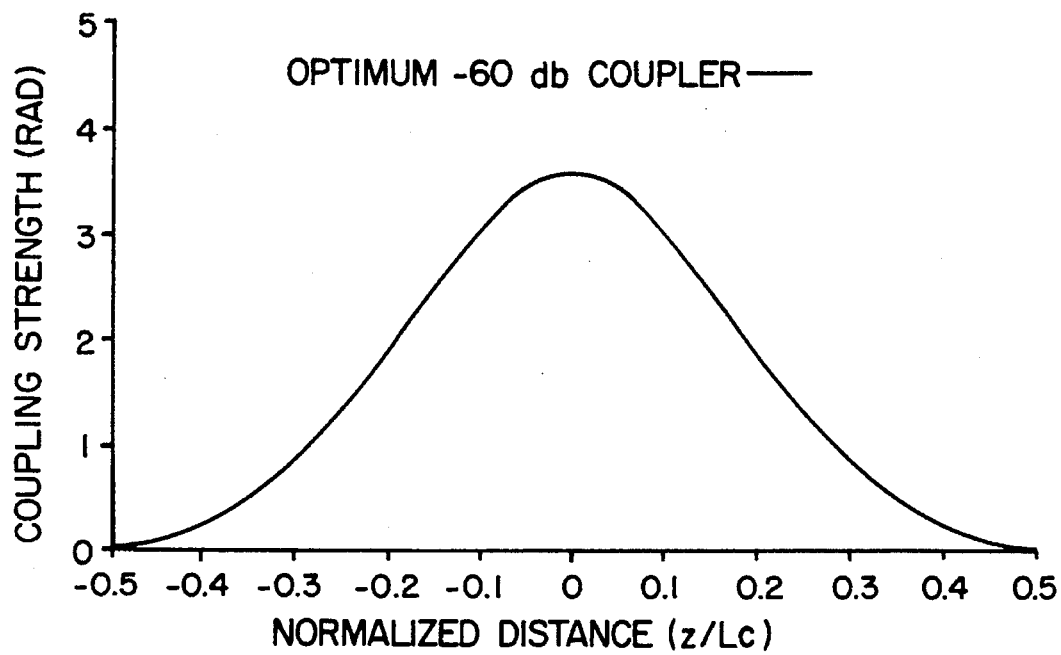
FIG. 4a shows coupling strength as a function of normalized propagation distance for an optimum coupler with −60 db sidelobes.
Figure 4B:
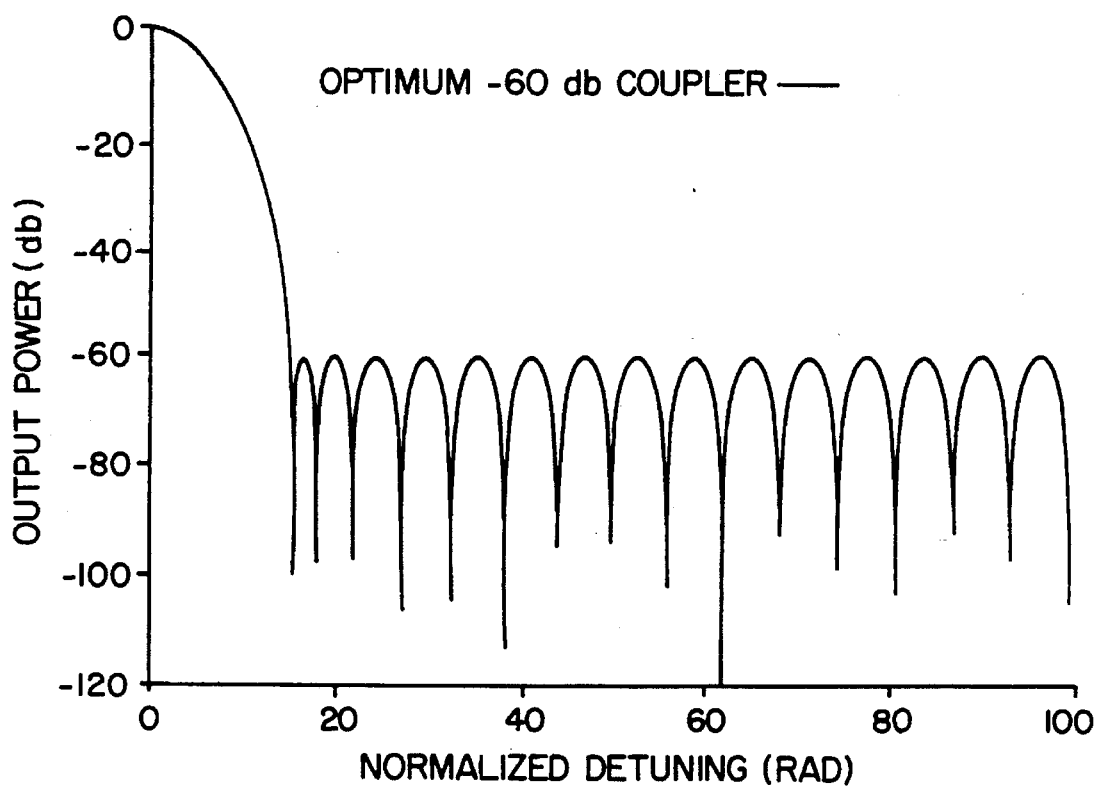
Figure 4C:
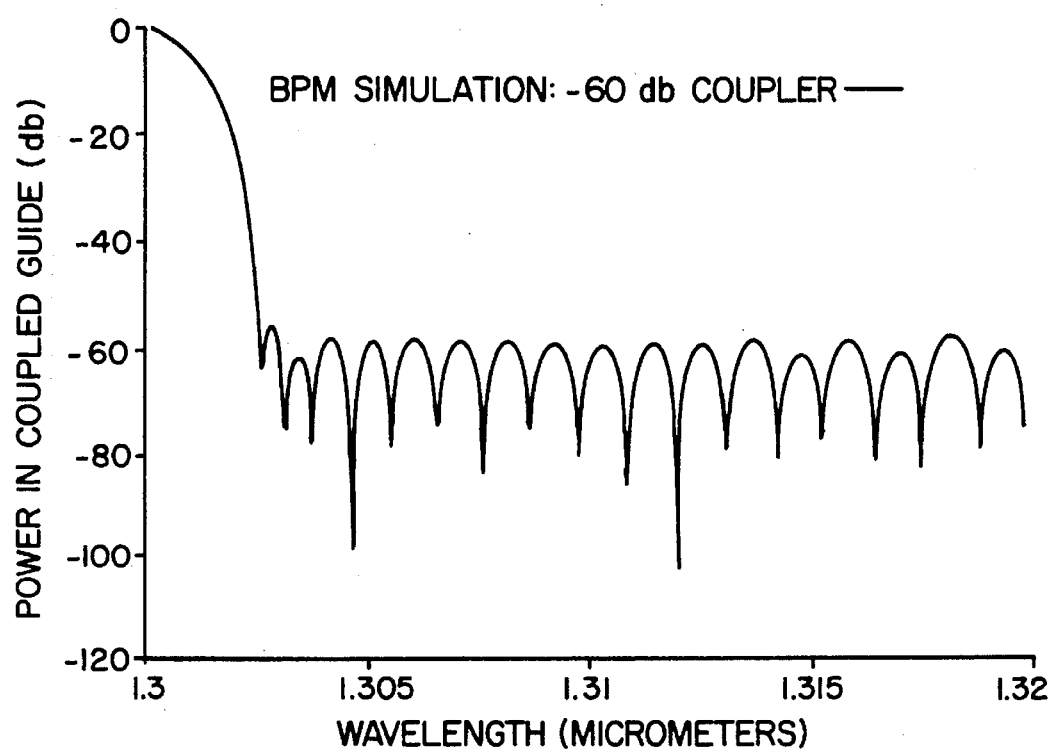
Figure 4D:
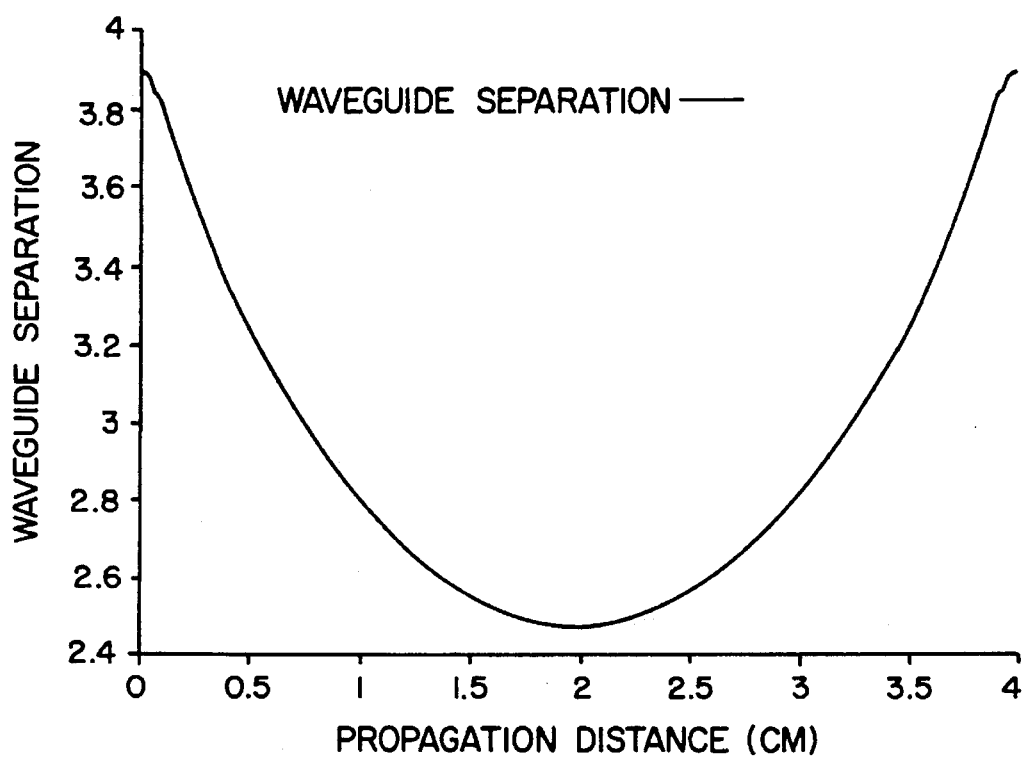
FIG. 4d illustrates physical separation between two adjacent waveguides for the BPM simulation of FIG. 4c.

A representative result of using Equations (3) and (4) for filter synthesis is given in FIG. 4a, which shows the optimum shape of k(z) for a coupler designed for −60 db sidelobes. The abscissa is in normalized length units. The actual physical length of the device is obtained by multiplying the abscissa in FIG. 4a by the coupling length $L_c$, of the specific device. The ordinate is the strength of k(z) in normalized units. k(z) may be translated into either interwaveguide spacing or grating strength, in a specific uniform coupler or grating-assisted coupler, respectively. FIG. 4b shows the theoretical spectral response of the taper shape of FIG. 4a. All the sidelobes are at −60 db, in order to achieve the minimum bandwidth for this maximum tolerable sidelobe level. FIG. 4c shows the response of a numerically simulated physical device. The simulation was performed using the Beam Propagation Method (BPM). This figure shows the very close correspondence that may be achieved in practice. The actual shape of the coupler is shown in FIG. 4d, which depicts the total separation between two adjacent waveguides (in μm) as a function of propagation distance (in cm).

A practically useful range for filter sidelobe design is the range of −40 db to −75 db. An approximation to the optimum shapes which cover this range is given by the design formula $$k(z)=L_0(z)+SL_1(z)+S^2L_2(z)+S^3L_3(z)+S^4L_4(z), \quad \text{Equation (6)}$$

where S is the desired sidelobe level in absolute decibels and the functions $L_i(z)$ are given by $$L_i(z)=\sum_{j=1}^{6} b_{i,j}\cos((2j-1)\pi z), (-0.5<z<0.5). \quad \text{Equation (7)}$$

The constant coefficients $b_{i,j}$ are given in TABLE 1.

TABLE 1

| | j | | | | | |
|---|---|---|---|---|---|---|
| $b_{i,j}$ | 1 | 2 | 3 | 4 | 5 | 6 |
| $b_{0,j}$ | 1.96526 | −0.175916 | 1.03664 | −0.514003 | 0.468375 | −0.335236 |
| $b_{1,j}$ | 2.65083e-2 | −7.15423e-3 | −6.89689e-3 | 3.01025e-2 | −2.79768e-2 | 1.99425e-2 |
| $b_{2,j}$ | −2.82597e-4 | 1.24012e-3 | 1.68102e-3 | −6.50960e-4 | 6.26496e-4 | −4.46475e-4 |
| $b_{3,j}$ | 8.61456e-7 | −1.92417e-5 | −1.73664e-5 | 6.26998e-6 | −6.23891e-6 | 4.45589e-6 |
| $b_{4,j}$ | 2.90113e-9 | 9.51447e-8 | 6.91843e-8 | −2.21879e-8 | 2.34583e-8 | −1.66805e-8 |

Figure 5:
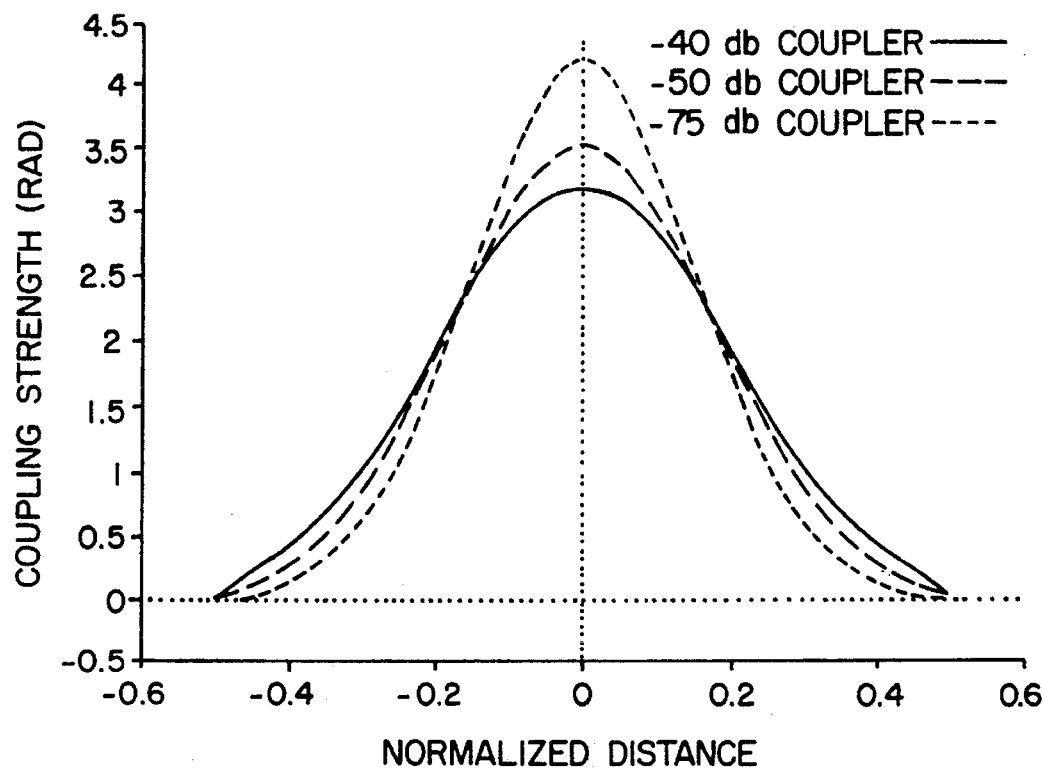
FIG. 5 shows taper shapes of −40 db, −50 db and −75 db couplers generated in accordance with the formula of the present invention.
Figure 6A:
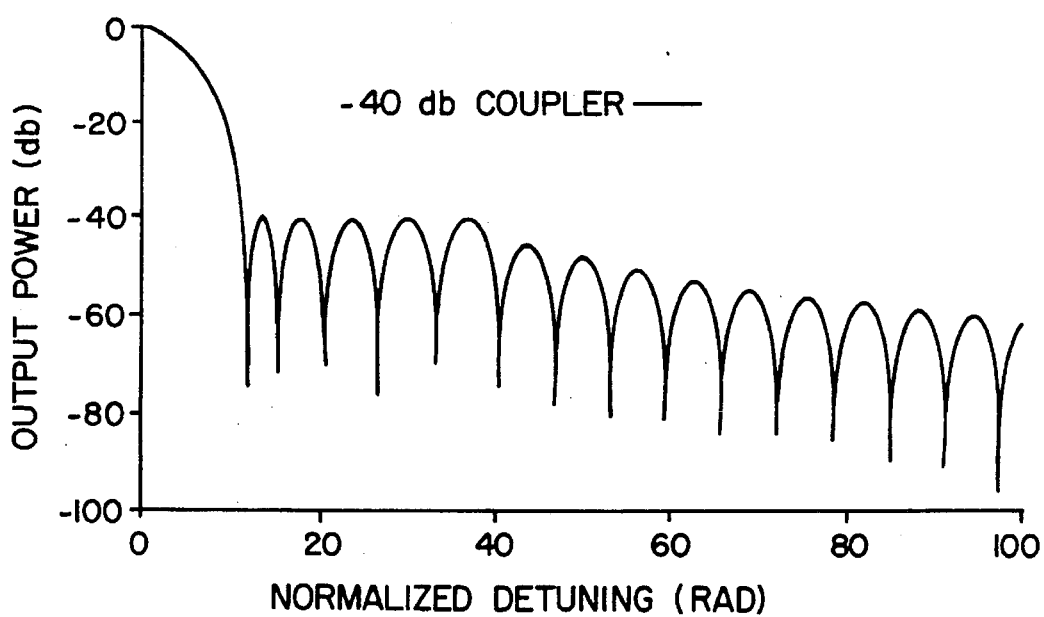
FIGS. 6a, 6b and 6c show spectral responses of the couplers of FIG. 5—for −40 db, −50 db and −75 db respectively.
Figure 6B:
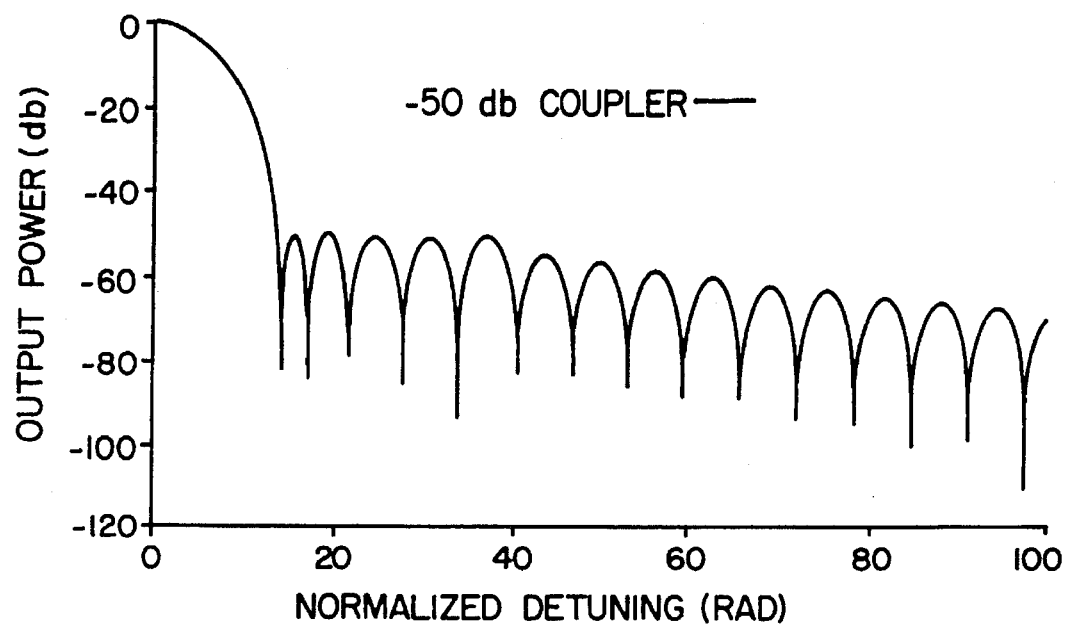
Figure 6C:
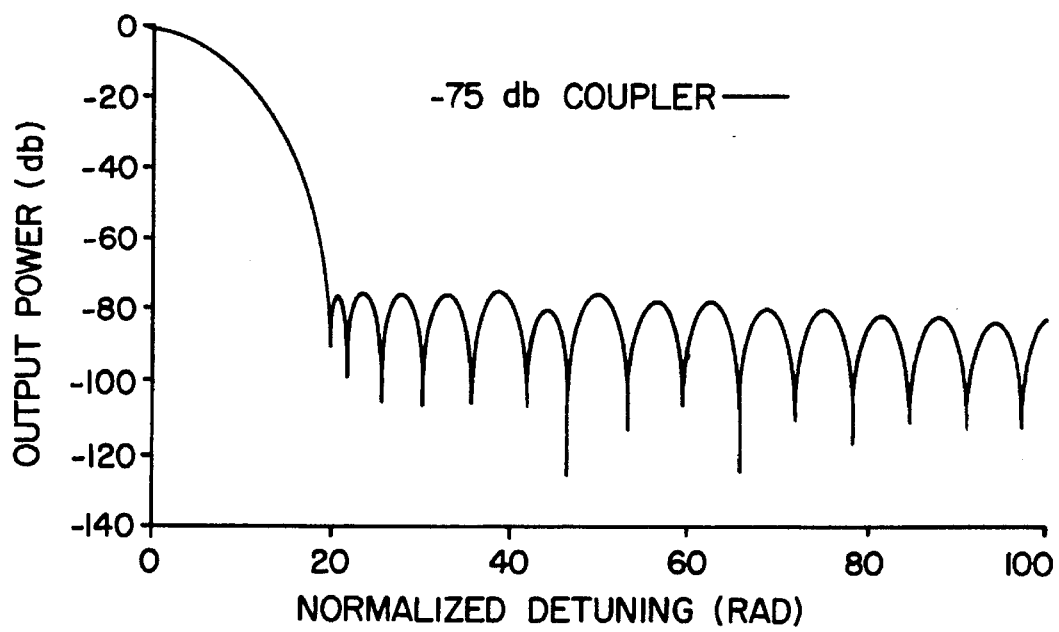

The normalized propagation distance is z, which ranges over $\{-0.5<z<0.5\}$. For a real device, the physical length scales as $Z=zL_c$, where Z is the physical length, z is the normalized length and $L_c$ is the length of the interaction region in the device. By substituting for a value of S in the range 40 to 75, Equation (6) gives the required interaction strength. The shapes for −40 db, −50 db, and −75 db sidelobe suppressed couplers are shown in FIG. 5. The corresponding spectral responses are shown in FIGURES 6a–6c. The trade-off in bandwidth versus sidelobe level for couplers designed by Equation (6) is shown in FIG. 7. The solid curve represents the results of Equation (6) while the dashed curve represents the ideal cases (as shown in FIG. 3).

FIG. 8 illustrates, generally, one practical embodiment of the present invention. It is to be understood that the spacing between waveguides must be such that the interactive strength satisfies Equation (6). This may be achieved by curving both waveguides as shown in FIG. 8 or by curving only one while the second remains straight.

It is known that the interaction strength between the two waveguides depends exponentially on their separation, $$K = K_0 \exp(-\gamma d) \qquad \text{Equation (8)}$$

where d is the separation between the two waveguides (edge to edge). In Equation (8), $K_0$ and $\gamma$ are constant coefficients that need to be determined for a specific device. By selecting two values of separation $d_1$ and $d_2$, two corresponding values of coupling strength, $K_1$ and $K_2$ may be determined by well known methods (see Hauset al, IEEE J. Lightwave Technology, Vol. LT-5, No. 1, pp. 16–23, 1987). Hence we may solve for the coefficients of $K_0$ and $\gamma$.

Equation (8) may be rearranged to write d in terms of K, $$d = \frac{1}{\gamma} \ln\left( \frac{K_0 \cdot L_c}{K \cdot L_c} \right) \qquad \text{Equation (9)}$$

$K \cdot L_c$ is the normalized coupling strength of Equation (6), (that is, $k(z) = K \cdot L_c$). Hence the physical separation d, given in terms of the normalized coupling strength $k(z)$ is $$d(Z) = \frac{1}{\gamma} \ln\left( \frac{K_0 \cdot L_c}{k(Z/L_c)} \right) \qquad \text{Equation (10)}$$

where Z is the physical distance, $L_c$ is the coupler's interaction length, z is the normalized distance given by $z = Z/L_c$, and $k(z) = k(Z/L_c)$ ms the function given in Equation (6).

These values can then be used to plot d vs Z or the relationship can be incorporated into mask layout design software to generate the necessary pattern to produce the waveguides.

The practical embodiment of the invention can be implemented in semiconductor material such as III–V or II–VI alloy compounds as well as a Si/Ge system. The configuration is also applicable in silica, glass, polymers and photorefractive materials such as lithium niobate.

while particular examples of the invention have been described it will be apparent to one skilled in the art that variations and alternatives are possible. Such variations include both lateral and vertical coupling of the waveguides. Also included are waveguides in which one or both are provided with gratings 4, as shown in FIG. 9. It is also contemplated that the waveguides can be provided with electrode means 6 (FIG. 10) in order to effect electro-optic tuning. It is to be understood, however, that such variations and alternatives fall within the scope of the invention as defined by the appended claims.

I claim:

1. A directional coupler filter comprising:
    a first waveguide for receiving an optical signal having at least one predetermined wavelength; and
    a second waveguide in a spaced relationship to said first waveguide so that said predetermined wavelength is selectively coupled from said first waveguide to said second waveguide wherein said spaced relationship is tailored to provide an interactive strength therebetween in accordance with the formula $$k(z) = L_0(z) + SL_1(z) + S^2 L_2(z) + S^3 L_3(z)$$

where
    $k(z)$ = interactive strength,
    $S$ = sidelobe level in $|dB|$, and
    $L_0, L_1, L_2, L_3$ are functions of the propagation distance (z) so as to suppress spectral sidelobes of said coupled wavelength to a level down to $-75$ db.

2. A directional coupler filter as defined in claim 1, fabricated in a semiconductor material.

3. A directional coupler filter as defined in claim 2, said semiconductor material being a III–V alloy compound.

4. A directional coupler filter as defined in claim 2, said semiconductor material being a II–VI alloy compound.

5. A directional coupler filter as defined in claim 1, fabricated in a glass material.

6. A directional coupler filter as defined in claim 1, fabricated in a polymer material.

7. A directional coupler filter as defined in claim 1, fabricated in a photorefractive material.

8. A directional coupler filter as defined in claim 7, said photorefractive material being lithium niobate.

9. A directional coupler filter as defined in claim 1, at least one of said waveguides having gratings to assist the coupling.

10. A directional coupler filter as defined in claim 1, at least one of said waveguides having electrode means in order to supply injection current thereto.

11. A directional coupler filter as defined in claim 1, said sidelobe level dependent on the spectral bandwidth of said coupled wavelength.

12. A directional coupler as defined in claim 11, said spectral bandwidth selected to be a minimum.

13. A method of suppressing the sidelobe levels in an optical directional coupler filter having a first waveguide to receive an optical signal having at least one predetermined wavelength and a second waveguide in spaced relationship to said first waveguide, said predetermined wavelength being selectively coupled to said second waveguide, the method comprising:
    tailoring the spaced relationship between said first and second waveguides so as to provide an interactive strength according to the formula:

$$k(z) = L_0(z) + SL_1(z) + S^2 L_2(z) + S^3 L_3(z)$$

wherein
    $k(z)$ = normalized interactive strength,
    $S$ = desired sidelobe level in $|dB|$, and
    $L_0, L_1 \ldots$ are functions of propagation distance (z).

* * * * *